United States Patent [19]
Kitterman et al.

[11] 3,990,571
[45] Nov. 9, 1976

[54] TRAY WASHING SYSTEM

[76] Inventors: Lawrence Pete Kitterman, 1309 Woodway, Hurst, Tex. 76053; Howard Gene Rice, 1109 Hadrian Court, Irving, Tex. 75060

[22] Filed: Apr. 16, 1975

[21] Appl. No.: 568,471

Related U.S. Application Data

[60] Continuation of Ser. No. 392,228, Aug. 28, 1973, abandoned, which is a division of Ser. No. 89,401, Nov. 3, 1970, Pat. No. 3,798,065.

[52] U.S. Cl. .............................. 198/356; 198/373; 134/133; 134/165
[51] Int. Cl.² ........................................ B65G 47/24
[58] Field of Search ............. 193/2 R; 198/282, 267, 198/262, 268, 276, 269–271, 277, 288, 26, 34; 134/63, 133, 165; 194/4 G; 235/61.11 R

[56] References Cited
UNITED STATES PATENTS

| | | | |
|---|---|---|---|
| 2,177,689 | 10/1939 | Dalkin | 194/4 G |
| 3,217,859 | 11/1965 | Bartlo et al. | 198/34 |
| 3,260,363 | 7/1966 | Vukosic | 198/234 |
| 3,426,773 | 2/1969 | Yatuni | 134/165 |

*Primary Examiner*—Evon C. Blunk
*Assistant Examiner*—Joseph E. Valenza
*Attorney, Agent, or Firm*—Richards, Harris and Medlock

[57] ABSTRACT

A tray washing system includes conveyors which transport compartmented food service trays from a tray receiving mechanism to inverting and scrapping mechanisms and through washing, rinsing and drying mechanisms to a stacking mechanism. The receiving mechanism restricts trays to insertion in a predetermined orientation in which the food receiving surfaces face upwardly, and the inverting mechanism inverts each tray so that the food receiving surface faces downwardly.

4 Claims, 5 Drawing Figures

TRAY WASHING SYSTEM

This is a continuation of application Ser. No. 392,228, filed Aug. 28, 1973, now abandoned, which is in turn a division of application Ser. No. 89,401, filed Nov. 3, 1970, now U.S. Pat. No. 3,798,065.

BACKGROUND AND SUMMARY OF THE INVENTION

This invention relates to a tray washing system, and more particularly to a fully automated system for cleaning compartmented food service trays.

Various institutions, particularly elementary schools, now serve lunches and other meals on compartmented food service trays, rather than on conventional tableware, such as dinner plates, salad plates, sauce dishes, etc. This is advantageous in that when compartmented food service trays are employed, the purchasing, stocking, distributing, collecting and washing of ware is reduced to a single item. Also, small children are considerably more adept at handling a compartmented food service tray than they are at handling the numerous tableware items that must be used when a meal is served in the conventional manner.

The main disadvantage that has been experienced in the use of compartmented food service trays relates to the human effort involved in washing the trays after each meal. At the present time, tray washing includes manually scraping each tray, manually loading each tray into a dishwashing machine, and to subsequently manually unloading each tray from the machine. Because conventional dishwashing machines are not designed for use with compartmented food service trays, it is often necessary to manually inspect each tray after washing, and to re-wash many of the trays. At today's labor rates, any system involving so much manual labor can be prohibitively expensive. Also, due to social connotations, it is often impossible to hire "dishwashers", even though good salaries are offered.

One approach to solving the foregoing problem involves the use of disposable compartmented food service trays. In order to reduce volume of material involved, machines for shreading and/or compacting disposable trays and the food and paper refuse associated therewith have been proposed. Unfortunately, the use of presently available disposable compartmented food service trays is not wholly satisfactory. For example, it costs more to purchase disposable compartmented food service trays than to wash conventional, permanent-type compartmented food service trays, so that no real savings are realized. Also, when a shreading and/or compacting machine is employed, the use of compartmented food service trays necessitates the handling of a great volume of refuse. Perhaps most importantly, presently available disposable compartmented food service trays are flimsy in construction and unappetizing in appearance, and are therefore unsatisfactory to students, dieticians and educators.

The present invention comprises a fully automated compartmented food service tray cleaning system. In accordance with the preferred embodiment of the invention, trays are moved in timed sequence to a mechanism that pours a cleaning fluid over each tray and thereby removes refuse and silverware from the tray. Thereafter, the trays are moved through washing, rinsing and drying stations to a mechanism that automatically deposits the trays on a mobile self-depressing tray receiver. Preferably, each tray is loaded into the system by the person who has used the tray so that all of the manual labor that has heretofore been necessary in the washing of compartmented food service trays is completely eliminated.

DESCRIPTION OF THE DRAWINGS

A more complete understanding of the invention may be had by referring to the following Detailed Description when taken in conjunction with the drawings, wherein.

DETAILED DESCRIPTION

Figures 1, 2:
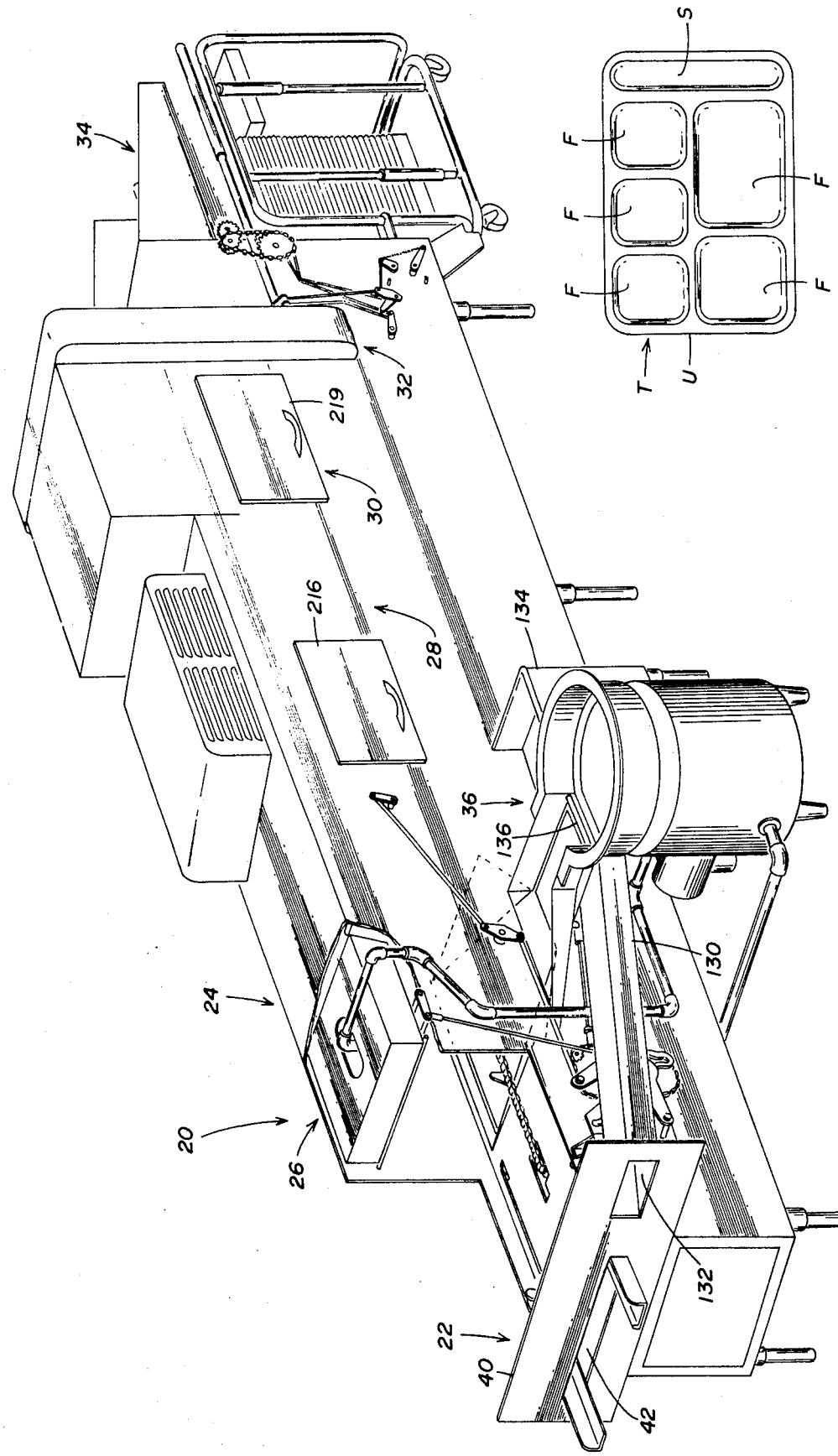
FIG. 1 is a top view of a compartmented food service tray.
FIG. 2 is a perspective view of a tray washing system employing the present invention.

Referring now to the drawings, and particularly to FIG. 1 thereof, a compartmented food service tray T is shown. The tray T is preferably formed from a durable material that is capable of withstanding repeated washings, such as plastic, fiberglass, or metal. The upper surface U of the tray T comprises a food receiving surface that is divided into a number of food receiving compartments F and a silverware receiving compartment S. It will be understood that the tray T actually comprises a sheet of uniform thickness, and that the compartment F and S comprise depressions formed in the sheet, so that a groove extends between the silverware compartment S and the remainder of the tray T.

Compartmented food service trays of the type shown in FIG. 1 are used in elementary schools to serve school lunches. Typically, a quantity of trays sufficient in number to serve all of the students is delivered to one or more serving stations. At the serving stations, various food items are deposited directly on the food receiving surface of each tray, and the tray is delivered to a student. The student also receives various pieces of silverware and additional food items, such as a beverage and a dessert. It will be understood that the latter items are normally distributed in individual cartons or containers.

After receiving his tray, each student carries the tray to a table, where the lunch is eaten. Upon completion of the meal, the students carry the trays to a refuse disposal area where paper refuse, i.e., milk cartons, straws, napkins, etc., from the meal is deposited in trash containers. Then, the students deposit the trays for cleaning with all refuse from the meal still on the tray, and simultaneously deposit silverware in a chute that leads to a silverware soaking sink. It will be understood that since the lunch was served directly on the upper surface of the trays in the food receiving compartments thereof, the trays must be scrapped, thoroughly washed and sterilized before they can be returned to the start of the cafeteria line for use in the next meal.

Referring now to FIG. 2, a tray washing system 20 employing the present invention is shown. The system 20 is adapted to automatically clean compartmented food service trays of the type shown in FIG. 1, and comprises: a tray receiving mechanism 22; a tray inverting mechanism 24; a scrapping mechanism 26; washing, rinsing and drying mechanisms 28, 30 and 32; and a tray stacking mechanism 34. The tray washing system 20 further includes a silverware separating and soaking mechanism 36.

Figure 3:
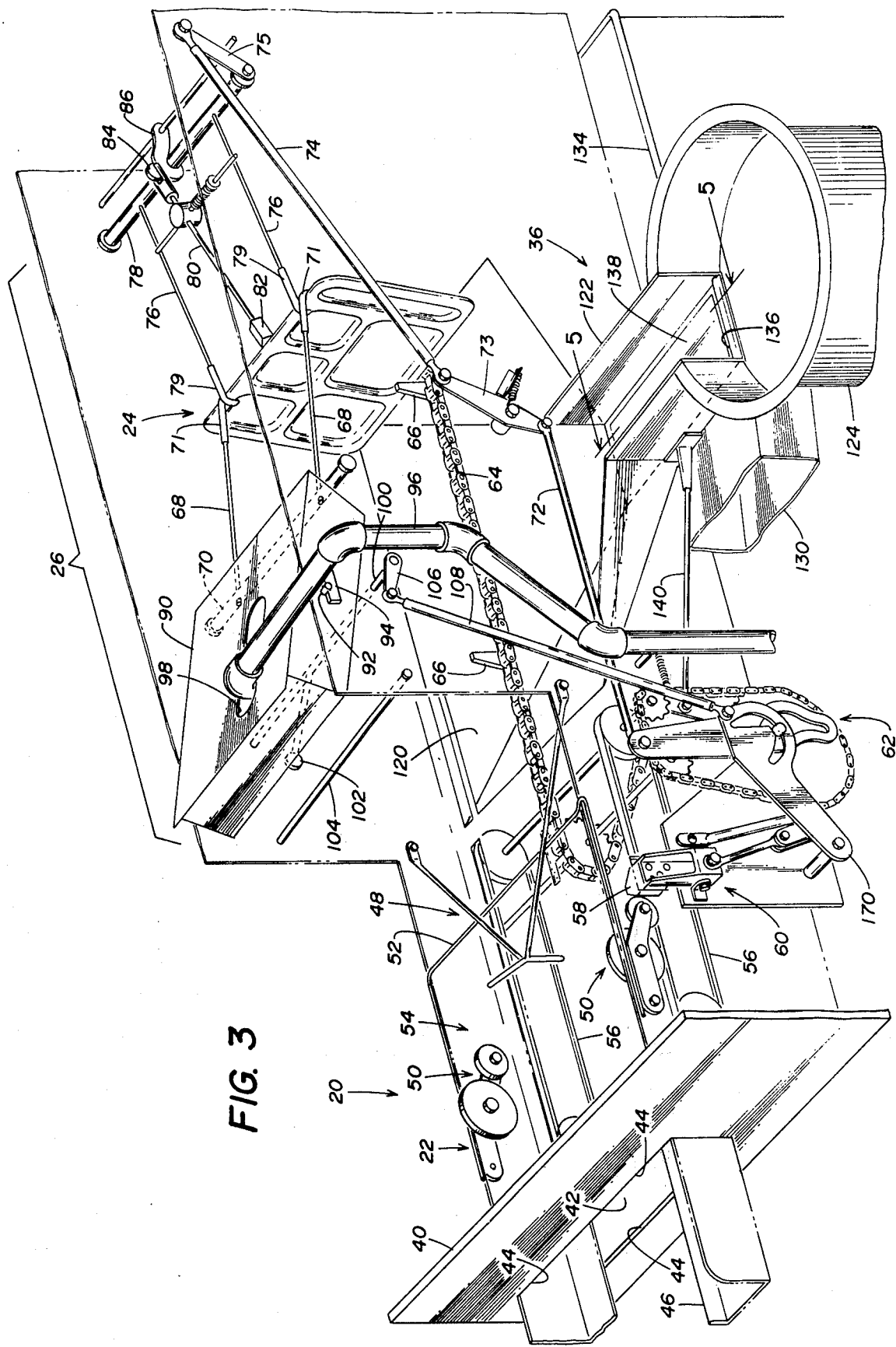
FIG. 3 is an enlarged perspective view of the tray receiving, tray inverting, scrapping, and silverware separating and soaking mechanisms of the tray washing system shown in FIG. 1.

The structural details of the tray receiving, tray inverting, scrapping, and silverware separating and soaking mechanisms of the tray washing system 20 are best shown in FIG. 3, wherein the functional components of the tray washing system are shown in full lines and the housing and other non-functional components are shown in phantom lines. The tray receiving mechanism 22 includes a plate 40 which may comprise a portion of a wall separating a school lunch room from a school kitchen. The plate 40 has a passageway 42 formed in it through which compartmented food service trays are inserted into the tray washing system 20 by the users of the trays. The edges of the plate 40 define the passageway 42 and include spaced pairs of opposed surfaces 44 which prevent the insertion of two stacked trays through the passageway 42. An upstanding ridge 46 formed in the bottom of the passageway 42 receives the groove between the silverware compartment and the food compartments of each tray, and thereby prevents the insertion of the trays other than with the silverware compartment positioned to the right and the food receiving surface facing upwardly.

A tray blocking member 48 is pivotally supported on the tray washing system 20 just beyond the passageway 42 in the plate 40. The tray blocking member 48 is normally positioned in the path of trays inserted through the passageway 42, and therefore prevents the insertion of trays in an endwise orientation. Two pairs of rollers 50 are pivotally supported at the opposite sides of the tray washing system 20 and are interconnected by a bar 52 that extends under the tray blocking member 48. The rollers 50 cooperate with the surface 44 of the plate 40 to prevent the insertion of two stacked trays. Also, a properly inserted compartmented food service tray engages the rollers 50 and pivots the rollers upwardly. This action pivots the bar 52 upwardly, which in turn pivots the blocking member 48 upwardly, out of the path of the tray. The pair of rollers 50 are arranged to maintain the blocking member 48 out of the path of a properly inserted tray until the tray clears the blocking member 48.

From the foregoing, it will be understood that the passageway 42, the ridge 46, and the tray blocking member 48 cooperate to constrain trays inserted into the tray washing system to a predetermined orientation. Properly oriented trays inserted through the passageway 42 are engaged with a conveyor 54 comprising a pair of V-belts 56 by the rollers 50. The V-belts advance each tray into engagement with a triangularly-shaped tray spacer member 58 comprising a portion of a tray timing machine 60. The spacer member 58 is normally positioned in the path of trays entering the tray washing system 20, and therefore normally prevents the movement of the trays into the tray washing system 20 under the action of the conveyor 54. At a predetermined point in each operating cycle of the tray washing system 20, a drive mechanism 42 actuates the timing mechanism 60 to pivot the spacer 58 out of the path of the trays, whereupon the conveyor 54 advances one tray into the tray washing system 20. By this means, the timing mechanism 60 assures a predetermined spacing between compartmented food service trays passing through the tray washing system 20. Because of its triangular shape, the spacer 58 enters the space between trays inserted sequentially through the passageway 42, and thereby prevents the insertion of trays other than at the proper point in the cycle of operation of the tray washing system.

Upon release by the timing mechanism 60, each tray is transported by the conveyor 54 to the end of the V-belts 56, whereupon it is engaged by a pin-type conveyor 64. The conveyor 54 includes a plurality of pins 66 spaced to receive trays from the conveyors 54 and to transport each tray entering the tray washing system 20 from the receiving mechanism 22 through the tray inverting mechanism 24. During this movement, the tray inverting mechanism 24 inverts each tray from its initial orientation wherein its food receiving surfaces faces upwardly to an orientation wherein the food receiving surface of the tray faces downwardly.

The tray inverting mechanism 24 includes a first pair of arms 68 which are supported for pivotal movement about the axis of a shaft 70 under the action of gravity. As the tray moves through the tray washing system 20 under the action of the pin-type conveyor 64, a pair of hooks 71 formed on the ends of the arms 68 engage the forward edge of the tray, whereupon the arms 68 cooperate with the conveyor 64 to pivot the tray into a vertical orientation. As the tray approaches the vertical orientation, the drive mechanism 62 operates through a rod 72, a lever 73, a rod 74 and a lever 75 to pivot a second pair of arms 76 about the axis of a shaft 78. This action engages a pair of hooks 79 formed on the ends of the arms 76 with the same edge of the tray that is engaged by the arms 68, whereupon the arms 76 pivot the tray from the vertical orientation to a horizontal orientation in which the food receiving surface of the tray faces downwardly.

The tray inverting mechanism 24 further includes an arm 80 mounted for pivotal movement with the arms 76. A tray engaging member 82 is secured to one end of the arm 80 and a roller 84 is secured to the other end. As the arm 80 pivots downwardly with the arms 76, the roller 84 follows the upper surface of the cam 86 and cooperates with the cam 86 to urge the tray engaging member 82 outwardly. This action grips the tray between the tray engaging member 82 and the hooks 79 of the arms 76.

Figure 4:
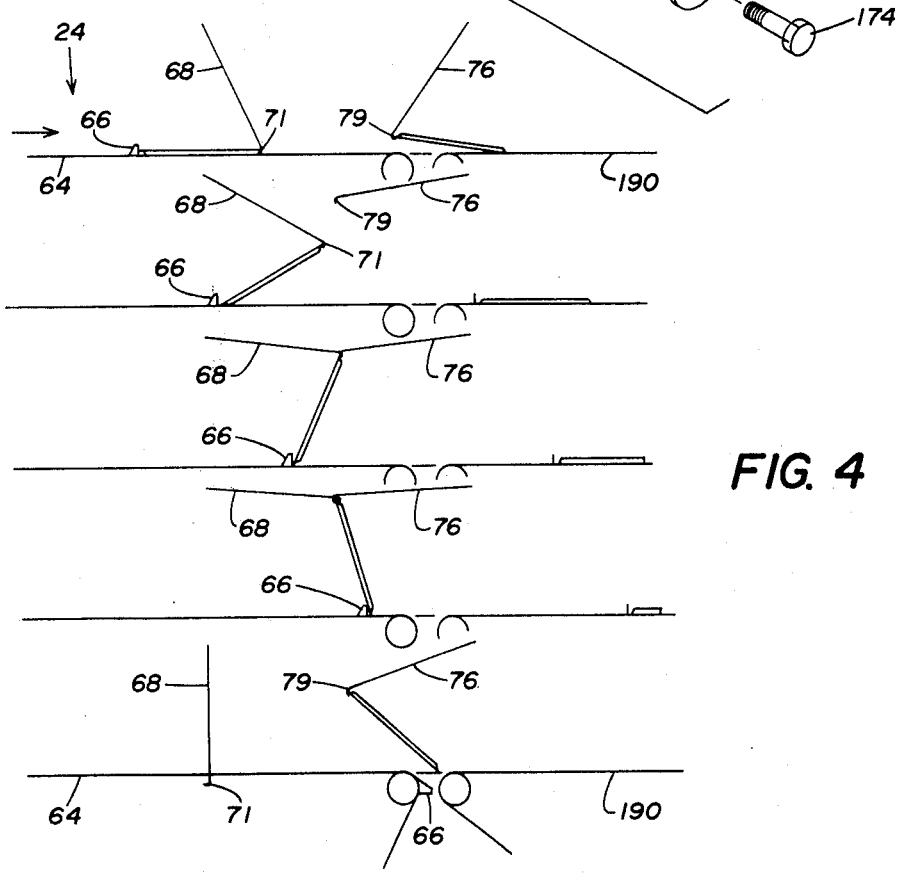
FIG. 4 is a schematic illustration showing various steps in the operation of the tray inverting mechanism.

The functions of the various components of the tray inversion mechanism 24 of the tray washing system 20 will be better understood by referring to FIG. 4, wherein various steps in the operation of the tray inverting mechanism 24 are schematically illustrated. As a compartmented food service tray is moved through the tray washing system 20 by the pin-type conveyor 64, it is engaged by the hooks 71 of the first pair of arms 68. Further forward motion of the tray under the action of the conveyor 64 causes the forward end of the tray to pivot upwardly about the axis of the shaft 70.

As the tray reaches a substantially vertical orientation, the drive mechanism 62 pivots the hooks 79 of the arms 76 into engagement with the same edge of the tray that is engaged by the arms 68. Upon further movement of the tray by the conveyor 64, the tray moves over center, whereupon the arms 68 drop out of engagement with the tray under the action of gravity. Then, the arms 76 complete the inversion of the tray. It should be noted that during the latter portion of the tray inversion process, the arms 76 push the tray forwardly to a point beyond the forward end of the conveyor 64.

Referring again to FIG. 3, the scrapping mechanism 26 of the tray washing system 20 includes a cleaning fluid reservoir 90 that is pivotally supported by a pair of trunnions 92 and a pair of yokes 94. A pipe 96 extends into the reservoir 90 through an elongated slot 98 formed in the upper surface thereof, and a cleaning fluid is continuously supplied to the reservoir 90 through the pipe 96. A pivotally supported shaft 100 extends under the reservoir 90 and an arm 102 extends perpendicularly from the shaft 100. Normally, the reservoir 90 is maintained in a retracted position wherein the reservoir 90 rests on the arm 102, and the arm 102 rests on a stationary shaft 104.

The shaft 100 is connected to the drive mechanism 62 through a bell crank 106 and a rod 108. As each tray passing through the tray washing system 20 is manipulated into a substantially vertical orientation by the tray inversion mechanism 24, the drive mechanism 62 moves the rod 108 upwardly. The action pivots the arm 102 upwardly about the axis of the shaft 100, and therefore tilts the reservoir 90 about the trunnions 92 from the position shown in FIG. 2 to the position shown in FIG. 3. During the tilting of the reservoir 90, cleaning fluid pours out of the reservoir onto the food receiving surface of the tray. This action "scraps" the tray, that is, the cleaning fluid flowing out of the reservoir 90 dislodges refuse and any silverware that may be on the tray. It has been found that the scrapping action of the present invention is superior to that of prior tableware cleaning systems in that by dumping substantially the entire contents of the reservoir 90 onto the food receiving surface of each tray passing through the tray washing system 20, the removal of all refuse and silverware from each tray is virtually assured, due to the weight and even distribution of the cleaning fluid flowing across the food receiving surface of the tray.

Cleaning fluid flowing over the food receiving surface of a tray from the reservoir 90 entrains refuse and any silverware that may be on the food receiving surface, and carries the refuse and silverware into a hopper 120. From the hopper 120, the cleaning fluid and the refuse and silverware entrained therein flow into the chute 122, and through the chute 122 into a refuse receiving mechanism 124. The refuse receiving mechanism 124 is conventional in design and operates to separate refuse dislodged by the scrapping mechanism 26 from the cleaning fluid employed in the scrapping mechanism. In accordance with the preferred embodiment of the invention, the cleaning fluid from the refuse receiving mechanism 124 is reused in the scrapping mechanism 26, that is, cleaning fluid from the refuse receiving mechanism 124 is returned to the reservoir 90 through the pipe 96.

Figure 5:
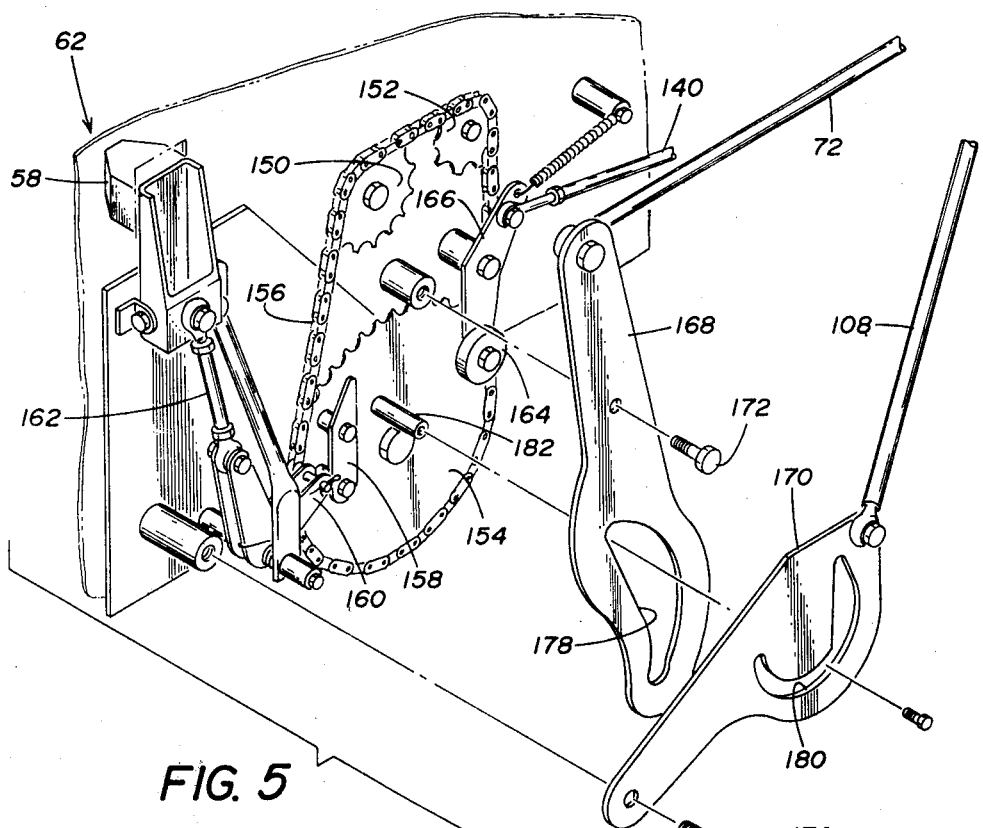
FIG. 5 is an exploded view of the drive mechanism of the tray receiving, tray inverting, scrapping mechanism and silverware separating and soaking mechanisms.

Referring now to FIG. 5, the construction of the drive mechanism 62 of the tray washing system 20 is shown in detail. The drive mechanism 62 includes a sprocket 150 that is continuously rotated by the motor (not shown). The sprocket 150 drives a sprocket 152 and a large sprocket 154 through a chain 156. A cam 158 is mounted on the sprocket 154 for rotation thereby. Once during each revolution of the sprocket 154, the cam 158 engages a bell crank 160 which is connected to the tray spacer member 58 by a link 162. The cam 158, the bell crank 160, the link 162 and the spacer 58 are so arranged that upon engagement of the cam 158 with the bell crank 160, the spacer 58 is pivoted out of the path of trays inserted into the tray washing mechanism 20 through the passageway 42.

Somewhat later during each revolution of the sprocket 154, the cam 158 engages a roller 164 that is mounted on a pivotally supported lever 166. The lever 166 is connected through the link 140 to the trapdoor 138 of the silverware separating and soaking mechanism 36 so that, upon rotation of the gear 150, the cam 158 actuates the trapdoor 138 of the silverware separating mechanism 38. Thus, upon rotation of the sprocket 154, the cam 158 actuates both the spacer 58 and the trapdoor 138 at the proper point in each operating cycle of the tray washing system 20.

The drive mechanism 62 further includes a pair of cams 168 and 170, which are connected to the rod 72 of the tray inverting mechanism 24 and the rod 108 of the scrapping mechanism 26, respectively. The cams 168 and 170 are pivotally supported on a pair of bolts 172 and 174, respectively, and have camming slots 178 and 180 formed through them. The slots 178 and 180 receive a drive pin 182 mounted on the sprocket 154 and, accordingly, upon rotation of the sprocket 154, the drive pin 182 oscillates the cams 168 and 170 to provide the motions necessary for the operation of the tray inverting mechanism 24 and the scrapping mechanism 26.

Although the preferred embodiment of the invention has been illustrated in the drawings and described in the foregoing specification, it will be understood that the invention is not limited to the embodiment disclosed, but is capable of rearrangement, modification and substitution of parts and elements without departing from the spirit of the invention.

What is claimed is:

1. In an apparatus for washing trays of the type having depressed food receiving areas surrounded by a continuous raised peripheral edge, each tray further having a non-symmetrically positioned groove formed in the bottom thereof which extends continuously from the front edge to the rear edge of the tray, the front to rear dimension of each tray being significantly less than the side to side dimension thereof, and the trays being nestable one into the other, apparatus for receiving trays that are in a predetermined orientation while rejecting trays that are in any other orientation which comprises:

means defining a tray receiving aperture;

said tray receiving aperture including vertically spaced apart surfaces positioned to receive a single tray therebetween while preventing the insertion through the tray receiving aperture of two or more nested trays therebetween and simultaneously preventing the insertion through the tray receiving aperture of trays oriented other than horizontally therebetween;

said tray receiving aperture being further characterized by an upstanding member for receiving the groove in the bottom of a properly oriented tray while preventing the insertion through the tray receiving aperture of trays oriented otherwise than in a predetermined horizontal orientation and for preventing the insertion through the tray receiving aperture of upside down trays;

said vertically spaced surfaces and upstanding member being positioned to operate on the same tray simultaneously;

a member normally positioned in the path of trays inserted into the tray receiving aperture for normally preventing complete tray insertion therethrough;

means responsive to the insertion of a properly oriented tray for moving the insertion preventing member out of the path of the tray and thereby permitting full insertion of the tray through the tray receiving aperture;

said insertion preventing member moving means being actuated by the side edges of a properly oriented tray, whereby the full insertion of a side ways oriented tray through the tray receiving aperture is prevented by the insertion preventing member;

a conveyor for transporting trays inserted through the tray receiving aperture;

timing means comprising a spacing member normally positioned in the path of trays inserted through the tray receiving aperture for normally preventing movement of the trays under the action of the conveyor; and means for periodically moving the spacing member out of engagement with the trays, and thereby permitting movement of the trays under the action of the conveyor.

2. The tray receiving mechanism according to claim 1 wherein the structure defining the tray receiving aperture is further characterized by plate means having the tray receiving aperture formed therethrough.

3. The tray receiving mechanism according to claim 2 wherein the vertically spaced apart surfaces of the tray receiving aperture comprise upper and lower horizontally extending surfaces, and wherein the upstanding member extends upwardly from the lower horizontally extending surface.

4. The tray receiving mechanism according to claim 1 wherein the timing means includes a spacer shaped to fit between trays inserted sequentially through the tray receiving aperture.

* * * * *